Patented Dec. 25, 1928.

1,696,199

UNITED STATES PATENT OFFICE.

FRITZ GÜNTHER, OF LUDWIGSHAFEN-ON-THE-RHINE, AND ADOLF CANTZLER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

AROMATIC SULPHONIC ACID.

No Drawing. Application filed November 18, 1926, Serial No. 149,268, and in Germany November 21, 1925.

We have found that sulphonic acids which are not dyestuffs and which are derived from aromatic compounds containing two or more aromatic nuclei linked together by carbon or other bridges and in which either all or some of the aromatic nuclei contain at least 1 hydrogen atom substituted by a hydrocarbon residue with at least 2 carbon atoms, possess soap-like properties and in particular valuable cleansing, wetting and emulsifying properties both in the free state as well as in the form of their salts. Besides the hydrocarbon residues with at least two carbon atoms, the said sulphonic acids may contain other substituents such for example as methyl, carboxylic acid, hydroxy, amino or nitro groups or halogen atoms and the like. The aromatic nucleus linked with the carbon bridge may be the same as the nucleus linked with the other part of the carbon bridge or the sulphonic acids may contain 2 or more different aromatic nuclei linked to the said bridge. Any kind of aromatic nuclei is suitable; they may consist of carbocyclic rings, or consist of or contain heterocyclic rings; as examples, benzene, toluene xylene, naphthalene, anthracene residues, pyridine, carbazol and homologues thereof may be mentioned. The hydrocarbon residues with at least two carbon atoms may be alkyl, aralkyl, or aryl groups or belong to the hydroaromatic series. As examples isopropyl, butyl, amyl, cyclo-hexyl, benzyl, or phenyl groups may be mentioned. The bridges linking the aromatic nuclei together may contain one or more carbon atoms, or they may be sulphur or oxygen or other suitable atoms or groups, such as nitrogen atoms, imino groups and the like.

The sulphonic acids may be obtained for example by condensing aldehydes with aromatic hydrocarbons or mixtures thereof of which one or more contain hydrogen are substituted by one or more hydrocarbon residues with at least two carbon atoms, and the said aromatic hydrocarbons may be free from or contain sulphonic acid groups; in case they are free from or contain a smaller number of such groups than desired, they are subjected to sulphonation, after the condensation with the aldehyde has taken place. Another way to obtain such sulphonic acids is the introduction of hydrocarbon residues with at least two carbon atoms into sulphonated or unsulphonated condensation products of aromatic hydrocarbons with aldehydes and subsequent sulphonation, if such is necessary. In particular, it is often of advantage to introduce into an aromatic hydrocarbon, hydrocarbon residues with at least two carbon atoms, to condense the resulting product with an aldehyde and then to sulphonate the condensation product.

As examples of suitable aldehydes, aliphatic aldehydes such as formaldehyde or acetaldehyde and others, or aromatic aldehydes such as benzaldehyde, sulphonic acids derived from benzaldehyde or the like, may be mentioned. Instead of aldehydes, compounds capable of supplying aldehydes, such as methylal, paraformaldehyde, poly-hydroxy-methylenes, paraldehyde, acetals and the like may be employed. In case aldehydes containing sulphonic acid groups and unsulphonated aromatic hydrocarbons are employed, it may not be necessary to sulphonate the resulting condensation product.

The new sulphonic acids may be prepared in a similar manner when other linking bridges, for example sulphur or oxygen are to be produced. In this case, for example sulphur dichlorid is employed instead of the aldehydes. Or the linking bridges may be produced in any other suitable manner.

The introduction of the hydrocarbon residues with at least two carbon atoms may be effected in any desired manner. Generally it will be effected with the aid of an alcohol in the presence of a condensing agent.

The new sulphonic acids as well as their salts are readily soluble in water and possess very good soap-like properties, for example good wetting, cleansing and emulsifying properties. They can be employed in all cases in which a wetting, cleansing or emulsifying action is required, for example for producing lather and as wetting agents in dyeing and other treatments of fibres and fibrous materials, for fulling, washing, cleansing, removing spots and the like. They are also suitable for use in acid solutions or baths, for example for acid fulling, carbonization, splitting fats and others, and are also applicable in the preparation of emulsions of liquids insoluble in water and of aqueous pastes of hydrocarbons, waxes, oils, for example bore-oils, and the like. Some of the new sulphonic acids are also very suitable for use as artificial tanning matters, or as catalytic fat saponifiers.

The following examples will further illustrate how our invention may be carried out in practice, but the invention is not limited to these examples. The parts are by weight. It should be understood that in the formulæ given in the examples the exact number of the alkyl radicals entering into the aromatic nuclei and the exact position, in which they enter into the acid nuclei is unknown; also the molecular weight of the compound is unknown, and several such complexes may be combined by several bridges.

*Example 1.*

256 parts of napthalene are converted in the known manner into beta-naphthalene sulphonic acid by means of 400 parts of concentrated sulphuric acid. The reaction mixture is allowed to cool to 100° C. whereupon a mixture of 252 parts of isopropyl alcohol and 412 parts of sulphuric acid of 66° Bé. is caused to run in in the course of an hour and a half, while stirring well. After the introduction of the mixture of alcohol and sulphuric acid the temperature of 100° C. is maintained for from 3 to 4 hours, whereupon at the same temperature 30 parts of formaldehyde in form of a 30 to 40 per cent aqueous solution are introduced in the course of an hour. The reaction is completed by further stirring for some hours. On cooling, the reaction product separates into two layers, the upper of which is diluted with water and neutralized by means of caustic soda lye; the dry salt obtained by evaporation possesses a good wetting power and is very capable of forming lather. The reaction may be illustrated by the following equations:—

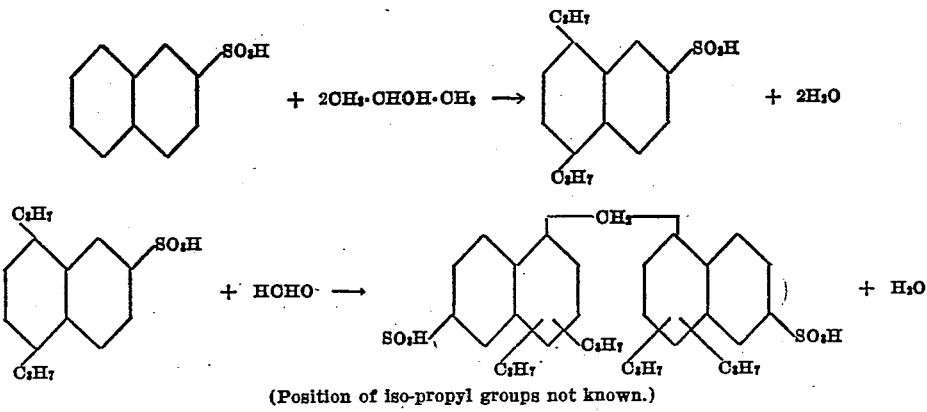

(Position of iso-propyl groups not known.)

*Example 2.*

Beta-napthalene sulphonic acid obtained by sulphonating 256 parts of naphthalene by means of 400 parts of sulphuric acid of 66° Bé. at 160° C. is allowed to cool and diluted with 412 parts of sulphuric acid of 66° Bé. whereupon 76 parts of methylal are slowly added at 20° C. while stirring well. After the reaction is finished, the mass is heated to 100° C. 252 parts isopropyl alcohol are slowly added, whereupon the reaction is completed by heating to 100° C. for some further hours. The product is worked up as described in Example 1. It has properties similar to those of the product there described. The reaction may be illustrated by the following equations:—

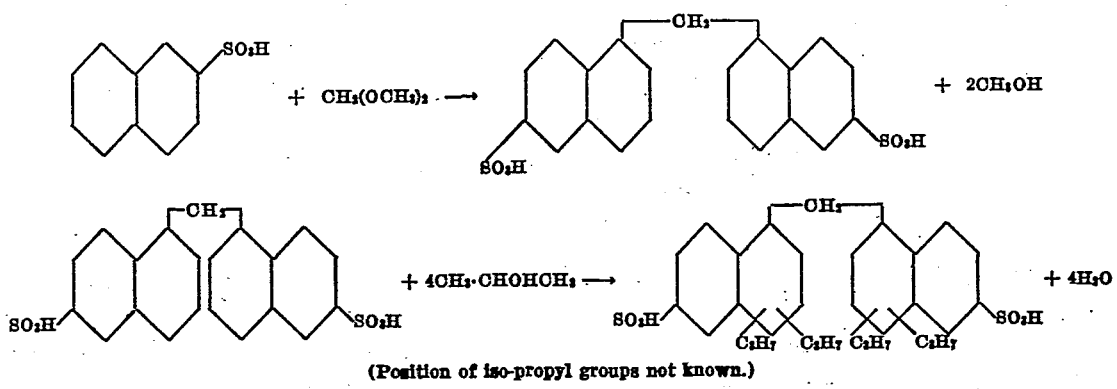

(Position of iso-propyl groups not known.)

*Example 3.*

128 parts of napthalene are added to a mixture prepared at room temperature from 150 parts of normal butyl alcohol and 150 parts of concentrated sulphuric acid, whereupon 250 parts of fuming sulphuric acid (containing 24 per cent of $SO_3$) are run in in the course of an hour while stirring well. During this time the temperature is maintained at between 15° and 25° C. The mixture is stirred for several hours while slowly raising the temperature to 50° C. Thereby a practically unsulphonated product is obtained which may be sulphonated as hereinafter described, after being condensed with an aldehyde or the like. It may, however, also be sulphonated before the condensation with an aldehyde, for which purpose the stirring should be carried on for a longer time or the temperature should be higher. When the sulphonation is to take place after the condensation, the mixture obtained as described above is cooled to between 20° and 25° C. whereupon in the course of half an hour 38 parts of methylal and then 100 parts of fuming sulphuric acid (with 24 per cent of $SO_3$) are added. The mixture is then stirred first at room temperature, finally at between 100° and 105° C. until the product is soluble in water. The resulting sulphonic acid is worked up in a suitable manner. The free acid as well as its salts are very capable of forming lather and possess a high wetting power. The reaction may be illustrated by the following equations:—

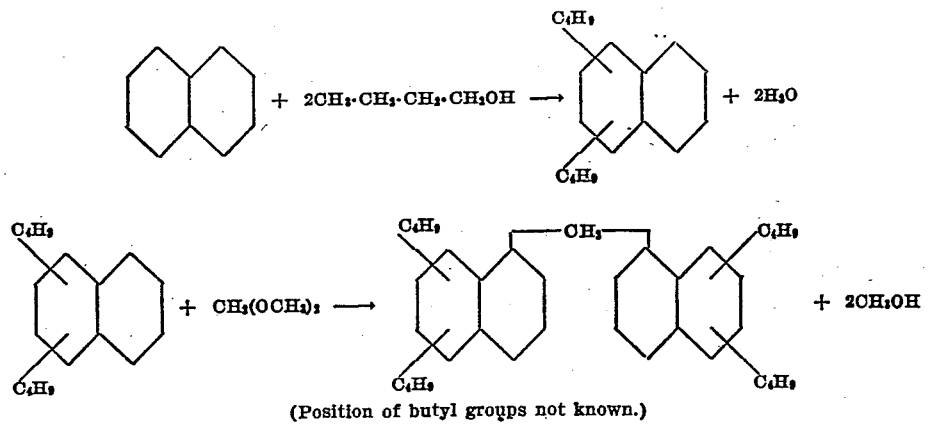

(Position of butyl groups not known.)

The sulphonation may take place either before or after condensation with methylal whereby the sulphonic acid groups may enter into only some of the aromatic nuclei.

We claim:

1. As new articles of manufacture, sulphonic acids of high cleansing, wetting and emulsifying power which are not dyestuffs and which are derived from aromatic compounds containing at least two aromatic nuclei linked together by a bridge and in which at least one aromatic nucleus contains at least 1 hydrogen atom substituted by a hydrocarbon residue with at least two carbon atoms.

2. As new articles of manufacture, sulphonic acids of high cleansing, wetting and emulsifying power which are not dyestuffs and which are derived from aromatic compounds containing two napthalene nuclei linked together by a carbon bridge and in which the aromatic nuclei contain at least one hydrogen atom substituted by an alkyl group containing from three to four carbon atoms.

3. The process of producing sulphonic acids of high cleansing, wetting and emulsifying power which consists in condensing an aromatic hydrocarbon with an alcohol containing at least two carbon atoms and with a compound capable of forming a bridge linking several residues of the aromatic hydrocarbon together (the aforesaid operation taking place in any desired order) and sulphonating the product.

4. The process of producing sulphonic acids of high cleansing, wetting and emulsifying power which consists in condensing an aromatic hydrocarbon with an alcohol containing at least two carbon atoms, condensing the reaction product with an aldehyde so as to link together several of the aromatic radicals, and sulphonating the product.

5. The process of producing sulphonic acids of high cleansing, wetting and emulsifying power which consists in condensing napthalene with an aliphatic alcohol containing from three to four carbon atoms, condensing the resulting product with a low aliphatic aldehyde and sulphonating the condensation product.

In testimony whereof we have hereunto set our hands.

FRITZ GÜNTHER.
ADOLF CANTZLER.